US012783889B2

(12) United States Patent
Yuan et al.

(10) Patent No.: US 12,783,889 B2
(45) Date of Patent: Nov. 3, 2026

(54) METHOD AND APPARATUS FOR COMPRESSING TOPOLOGY RECOGNITION MODEL, ELECTRONIC DEVICE, AND MEDIUM

(71) Applicant: BEIJING SMARTCHIP MICROELECTRONICS TECHNOLOGY COMPANY LIMITED, Beijing (CN)

(72) Inventors: Jianan Yuan, Beijing (CN); Chao Huo, Beijing (CN); Huifeng Bai, Beijing (CN); Ganghong Zhang, Beijing (CN); Jian Gao, Beijing (CN); Libin Zheng, Beijing (CN); Huadong Yu, Beijing (CN); Zhibin Yin, Beijing (CN); Anqin Luo, Beijing (CN); Fan Xie, Beijing (CN); Yifan Shen, Beijing (CN); Shuangshuang Yang, Beijing (CN); Xiao Ding, Beijing (CN)

(73) Assignee: BEIJING SMARTCHIP MICROELECTRONICS TECHNOLOGY COMPANY LIMITED, Beijing (CN)

( * ) Notice: Subject to any disclaimer, the term of this patent is extended or adjusted under 35 U.S.C. 154(b) by 502 days.

(21) Appl. No.: 18/287,657

(22) PCT Filed: Aug. 9, 2023

(86) PCT No.: PCT/CN2023/111880

§ 371 (c)(1),
(2) Date: Oct. 20, 2023

(87) PCT Pub. No.: WO2024/037393

PCT Pub. Date: Feb. 22, 2024

(65) Prior Publication Data

US 2025/0086460 A1 Mar. 13, 2025

(30) Foreign Application Priority Data

Aug. 17, 2022 (CN) ........................ 202210983746.3

(51) Int. Cl.
*G06N 3/082* (2023.01)
*G06N 3/0495* (2023.01)

(52) U.S. Cl.
CPC ........... *G06N 3/082* (2013.01); *G06N 3/0495* (2023.01)

(58) Field of Classification Search
None
See application file for complete search history.

(56) References Cited

U.S. PATENT DOCUMENTS 12,591,777 B2 * 3/2026 Theodorakopoulos ..................... G06N 3/082

FOREIGN PATENT DOCUMENTS

CN 108615049 A 10/2018
CN 110009528 A * 7/2019 ............ G06Q 10/04

(Continued)

OTHER PUBLICATIONS

Espacenet translation of CN 110009528 A (Zhang) (Year: 2019).*

*Primary Examiner* — Tyler W. Sullivan

(57) ABSTRACT

Provided are a method and apparatus for compressing a topology recognition model, an electronic device, and a medium. The method includes: pruning a to-be-compressed model to obtain a pruned model, and training the pruned model to obtain a trained pruned model; quantifying a bit quantity of a weight parameter of each neural network layer in the trained pruned model from a first bit quantity to a second bit quantity to obtain a highly-quantified pruned model, and training the highly-quantified pruned model to obtain a trained highly-quantified pruned model; using the trained highly-quantified pruned model as the to-be-com- (Continued)

pressed model, continuously pruning and quantifying the to-be-compressed model until a compressed topology recognition model is obtained, and deploying the compressed topology recognition model on an Internet of Things in Power Systems (IOTIPS) terminal, to reduce a size of the topology recognition model.

27 Claims, 7 Drawing Sheets

(56) References Cited

FOREIGN PATENT DOCUMENTS

| | | | | |
|---|---|---|---|---|
| CN | 112329922 A | | 2/2021 | |
| CN | 112698123 A | | 4/2021 | |
| WO | WO-2024126760 A1 | * | 6/2024 | ............... G06N 3/09 |

* cited by examiner

METHOD AND APPARATUS FOR COMPRESSING TOPOLOGY RECOGNITION MODEL, ELECTRONIC DEVICE, AND MEDIUM

TECHNICAL FIELD

The present disclosure relates to the technical field of computers, and specifically, to a method and apparatus for compressing a topology recognition model, an electronic device, and a medium.

BACKGROUND

A prerequisite for planning, operating, and controlling a power grid is to accurately learn a topological structure of a distribution network. However, with access of a large amount of new energy, a topology of the distribution network changes frequently. Therefore, the topological structure of the distribution network is often unknown. In order to accurately recognize the topological structure of the distribution network, a topology recognition model can be used to recognize the topological structure of the distribution network. The topology recognition model is obtained by training a deep neural network model and has high recognition accuracy. However, due to a complex structure, the topology recognition model can only run on a server. With the development of distribution network businesses, running the topology recognition model on an Internet of Things in Power Systems (IOTIPS) terminal is necessary to recognize a topological structure in a supply transformer area conveniently. However, the IOTIPS terminal has limited hardware resources, with limitations on storage, computing power, power consumption, and bandwidth, which makes it difficult to deploy a deep learning model on an IOTIPS terminal device.

A good solution is to compress the topology recognition model and deploy a compressed topology recognition model on the IOTIPS terminal device. However, compressing the topology recognition model will inevitably decrease measurement accuracy of the topology recognition model.

Therefore, a technical problem to be urgently resolved is how to effectively reduce a size of the topology recognition model while ensuring that the topology recognition model meet an accuracy requirement, such that the topology recognition model can be run on the IOTIPS terminal.

SUMMARY

To resolve problems in related technologies, embodiments of the present disclosure provide a method and apparatus for compressing a topology recognition model, an electronic device, and a medium.

According to a first aspect, an embodiment of the present disclosure provides a method for compressing a topology recognition model, including: pruning a to-be-compressed model to obtain a pruned model, and training the pruned model to obtain a trained pruned model, where the to-be-compressed model is a topology recognition model, and the topology recognition model is a machine learning model running on a server to recognize a topological structure of a power grid; quantifying a bit quantity of a weight parameter of each neural network layer in the trained pruned model from a first bit quantity to a second bit quantity to obtain a highly-quantified pruned model, and training the highly-quantified pruned model to obtain a trained highly-quantified pruned model, where the second bit quantity is less than the first bit quantity; and using the trained highly-quantified pruned model as the to-be-compressed model, continuously pruning and quantifying the to-be-compressed model until a compressed topology recognition model is obtained, and deploying the compressed topology recognition model on an IOTIPS terminal.

In some embodiments, the pruning a to-be-compressed model to obtain a pruned model includes: determining a redundant channel of the to-be-compressed model through sparse regularization training, and removing the redundant channel from the to-be-compressed model to obtain the pruned model.

In some embodiments, the method further includes: using a fully connected layer as a linear classifier, and obtaining recognition accuracy of each neural network layer in the to-be-compressed model by the linear classifier; and if a difference between recognition accuracy of any two adjacent neural network layers in the to-be-compressed model is less than a preset difference threshold, removing a neural network layer with the lower recognition accuracy in the any two adjacent neural network layers.

In some embodiments, the using a fully connected layer as a linear classifier, and obtaining recognition accuracy of each neural network layer in the to-be-compressed model by the linear classifier includes: selecting any two adjacent neural network layers from the to-be-compressed model, and removing one of the any two adjacent neural network layers to obtain a neural network layer accuracy prediction model; and testing the neural network layer accuracy prediction model by a labeled prediction dataset, to obtain output accuracy of the neural network layer accuracy prediction model, and using the output accuracy as recognition accuracy of an unremoved neural network layer in the any two adjacent neural network layers.

In some embodiments, the training the pruned model to obtain a trained pruned model includes: using the to-be-compressed model to label training data in an unlabeled training dataset to obtain a training dataset; and training the pruned model by the training dataset, to obtain the trained pruned model.

In some embodiments, the using the to-be-compressed model to label training data in an unlabeled training dataset to obtain a training dataset includes: inputting the training data into the to-be-compressed model, and using an output result of the to-be-compressed model as a label of the training data; and using the training data and the label of the training data as a group of training data in the training dataset.

In some embodiments, the training the pruned model by the training dataset, to obtain the trained pruned model includes: obtaining a loss value by a loss function based on an output of the pruned model and a label of training data in the training dataset; determining, based on the loss value, whether the loss function converges; and if the loss function converges, stop the training; or if the loss function does not converge, adjusting a parameter of the pruned model, and proceeding with a next training until the loss function converges or a number of training iterations reaches a preset threshold of the training iterations.

In some embodiments, the method further includes: if the number of training iterations reaches the preset threshold of the training iterations and the loss function does not converge, adding a channel or a neural network layer to the pruned model with reference to the to-be-compressed model.

In some embodiments, the quantifying a bit quantity of a weight parameter of each neural network layer in the trained pruned model from a first bit quantity to a second bit quantity to obtain a highly-quantified pruned model includes: quantifying a bit quantity of a weight parameter of each neural network layer in the pruned model from the first bit quantity to the second bit quantity, and training the pruned model; quantifying a bit quantity of a weight parameter of a fully connected layer of the pruned model from the first bit quantity to the second bit quantity, and training the pruned model; and quantifying an activation function of the pruned model to obtain the highly-quantified pruned model.

In some embodiments, the training the highly-quantified pruned model to obtain a trained highly-quantified pruned model includes: selecting at least one neural network layer from the highly-quantified pruned model to construct a loss function; using the pruned model to label training data in an unlabeled training dataset to obtain a training dataset; and training the highly-quantified pruned model based on the loss function and the training dataset to obtain the trained highly-quantified pruned model.

In some embodiments, the using the pruned model to label training data in an unlabeled training dataset to obtain a training dataset includes: inputting the training data into the pruned model, and using an output of a reference network layer in the pruned model as a label of the training data, where the reference network layer corresponds to the at least one selected neural network layer in the highly-quantified pruned model; and using the training data and the label of the training data as a group of training data in the training dataset.

In some embodiments, the training the highly-quantified pruned model based on the loss function and the training dataset to obtain the trained highly-quantified pruned model includes: obtaining a loss value by the loss function based on an output of the at least one neural network layer of the highly-quantified pruned model and a label of training data in the training dataset; determining, based on the loss value, whether the loss function converges; and if the loss function converges, stopping the training; or if the loss function does not converge, adjusting a parameter of the highly-quantified pruned model, and proceeding with a next training until the loss function converges or a number of training iterations reaches a preset threshold of the training iterations.

In some embodiments, the method further includes: if the number of training iterations reaches the preset threshold of the training iterations and the loss function does not converge, increasing a bit quantity of at least one weight parameter of the highly-quantified pruned model from the second bit quantity to the first bit quantity with reference to a weight parameter of the neural network layer in the pruned model.

In some embodiments, the quantifying a bit quantity of a weight parameter of each neural network layer in the pruned model from the first bit quantity to the second bit quantity includes: selecting at least one neural network layer from the pruned model by a preset algorithm successively, and quantifying a bit quantity of a weight parameter of the at least one neural network layer from the first bit quantity to the second bit quantity.

According to a second aspect, an embodiment of the present disclosure provides an apparatus for compressing a topology recognition model, including: a pruning module configured to prune a to-be-compressed model to obtain a pruned model, and train the pruned model to obtain a trained pruned model, where the to-be-compressed model is a topology recognition model, and the topology recognition model is a machine learning model running on a server to recognize a topological structure of a power grid; a quantification module configured to quantify a bit quantity of a weight parameter of each neural network layer in the trained pruned model from a first bit quantity to a second bit quantity to obtain a highly-quantified pruned model, and train the highly-quantified pruned model to obtain a trained highly-quantified pruned model, where the second bit quantity is less than the first bit quantity; and a deployment module configured to use the trained highly-quantified pruned model as the to-be-compressed model, continuously prune and quantify the to-be-compressed model until a compressed topology recognition model is obtained, and deploy the compressed topology recognition model on an IOTIPS terminal.

In some embodiments, a process of pruning a to-be-compressed model to obtain a pruned model includes: determining a redundant channel of the to-be-compressed model through sparse regularization training, and removing the redundant channel from the to-be-compressed model to obtain the pruned model.

In some embodiments, the apparatus further includes: a network layer recognition accuracy obtaining module configured to use a fully connected layer as a linear classifier, and obtain recognition accuracy of each neural network layer in the to-be-compressed model by the linear classifier; and a removal module configured to: if a difference between recognition accuracy of any two adjacent neural network layers in the to-be-compressed model is less than a preset difference threshold, remove a neural network layer with the lower recognition accuracy in the any two adjacent neural network layers.

In some embodiments, a process of using a fully connected layer as a linear classifier, and obtaining recognition accuracy of each neural network layer in the to-be-compressed model by the linear classifier includes: selecting any two adjacent neural network layers from the to-be-compressed model, and removing one of the any two adjacent neural network layers to obtain a neural network layer accuracy prediction model; and testing the neural network layer accuracy prediction model by a labeled prediction dataset, to obtain output accuracy of the neural network layer accuracy prediction model, and using the output accuracy as recognition accuracy of an unremoved neural network layer in the any two adjacent neural network layers.

In some embodiments, a process of training the pruned model to obtain a trained pruned model includes: using the to-be-compressed model to label training data in an unlabeled training dataset to obtain a training dataset; and training the pruned model by the training dataset, to obtain the trained pruned model.

In some embodiments, the using the to-be-compressed model to label training data in an unlabeled training dataset to obtain a training dataset includes: inputting the training data into the to-be-compressed model, and using an output result of the to-be-compressed model as a label of the training data; and using the training data and the label of the training data as a group of training data in the training dataset.

In some embodiments, the training the pruned model by the training dataset, to obtain the trained pruned model includes: obtaining a loss value by a loss function based on an output of the pruned model and a label of training data in the training dataset; determining, based on the loss value, whether the loss function converges; and if the loss function converges, stop the training; or if the loss function does not converge, adjusting a parameter of the pruned model, and proceeding with a next training until the loss function converges or a number of training iterations reaches a preset threshold of the training iterations.

In some embodiments, the apparatus further includes: a channel or network layer adding module configured to: if the number of training iterations reaches the preset threshold of the training iterations and the loss function does not converge, add a channel or a neural network layer to the pruned model with reference to the to-be-compressed model.

In some embodiments, a process of quantifying a bit quantity of a weight parameter of each neural network layer in the trained pruned model from a first bit quantity to a second bit quantity to obtain a highly-quantified pruned model includes: quantifying a bit quantity of a weight parameter of each neural network layer in the pruned model from the first bit quantity to the second bit quantity, and training the pruned model; quantifying a bit quantity of a weight parameter of a fully connected layer of the pruned model from the first bit quantity to the second bit quantity, and training the pruned model; and quantifying an activation function of the pruned model to obtain the highly-quantified pruned model.

In some embodiments, a process of training the highly-quantified pruned model to obtain a trained highly-quantified pruned model includes: selecting at least one neural network layer from the highly-quantified pruned model to construct a loss function; using the pruned model to label training data in an unlabeled training dataset to obtain a training dataset; and training the highly-quantified pruned model based on the loss function and the training dataset to obtain the trained highly-quantified pruned model.

In some embodiments, the using the pruned model to label training data in an unlabeled training dataset to obtain a training dataset includes: inputting the training data into the pruned model, and using an output of a reference network layer in the pruned model as a label of the training data, where the reference network layer corresponds to the at least one selected neural network layer in the highly-quantified pruned model; and using the training data and the label of the training data as a group of training data in the training dataset.

In some embodiments, the training the highly-quantified pruned model based on the loss function and the training dataset to obtain the trained highly-quantified pruned model includes: obtaining a loss value by the loss function based on an output of the at least one neural network layer of the highly-quantified pruned model and a label of training data in the training dataset; determining, based on the loss value, whether the loss function converges; and if the loss function converges, stopping the training; or if the loss function does not converge, adjusting a parameter of the highly-quantified pruned model, and proceeding with a next training until the loss function converges or a number of training iterations reaches a preset threshold of the training iterations.

In some embodiments, the apparatus further includes: an inverse quantification module configured to: if the number of training iterations reaches the preset threshold of the training iterations and the loss function does not converge, increase a bit quantity of at least one weight parameter of the highly-quantified pruned model from the second bit quantity to the first bit quantity with reference to a weight parameter of the neural network layer in the pruned model.

In some embodiments, the quantifying a bit quantity of a weight parameter of each neural network layer in the pruned model from the first bit quantity to the second bit quantity includes: selecting at least one neural network layer from the pruned model by a preset algorithm successively, and quantifying a bit quantity of a weight parameter of the at least one neural network layer from the first bit quantity to the second bit quantity.

According to a third aspect, an embodiment of the present disclosure provides a chip, including the apparatus according to any one of the embodiments in the second aspect.

According to a fourth aspect, an embodiment of the present disclosure provides an electronic device, including: a memory and a processor, where the memory is configured to store at least one computer instruction, and the at least one computer instruction is executed by the processor to implement the method described above.

According to a fifth aspect, an embodiment of the present disclosure provides a computer-readable storage medium storing a computer instruction, where the computer instruction is executed by a processor to implement the method described above.

According to the technical solutions provided in the embodiments of the present disclosure, a to-be-compressed model is pruned to obtain a pruned model, and the pruned model is trained to obtain a trained pruned model; a bit quantity of a weight parameter of each neural network layer in the trained pruned model is quantified from a first bit quantity to a second bit quantity to obtain a highly-quantified pruned model, and the highly-quantified pruned model is trained to obtain a trained highly-quantified pruned model. The pruning and quantification operations are performed alternately to effectively reduce a size of a deep learning model while ensuring that the deep learning model meets an accuracy requirement.

It should be understood that the above general description and the following detailed description are only exemplary and explanatory, and should not be construed as a limitation to the present disclosure.

BRIEF DESCRIPTION OF THE DRAWINGS

Other features, objectives, and advantages of the present disclosure will become more apparent based on the detailed description of the following non-limiting implementations with reference to the following accompanying drawings. In the accompanying drawings.

DETAILED DESCRIPTION

Exemplary embodiments of the present disclosure will be described below in more detail with reference to the accompanying drawings, such that those skilled in the art can easily implement the exemplary embodiments. Furthermore, for clarity, parts unrelated to the description of the exemplary embodiments have been omitted from the accompanying drawings.

In the present disclosure, it should be understood that the terms such as “including/comprising” and “having” indicate the existence of the stated features, digits, steps, behaviors, components, parts, or combinations thereof. However, these terms do not exclude the possibility of the existence or addition of one or more other features, digits, steps, behaviors, components, parts, or combinations thereof.

It should be additionally noted that, if there is no conflict, the following embodiments and features in the embodiments may be mutually combined. The present disclosure is described in detail below with reference to the accompanying drawings and embodiments.

In the present disclosure, any operation of obtaining user information or user data or displaying user information or user data to others is authorized, confirmed, or voluntarily selected by a user.

Figure 1:
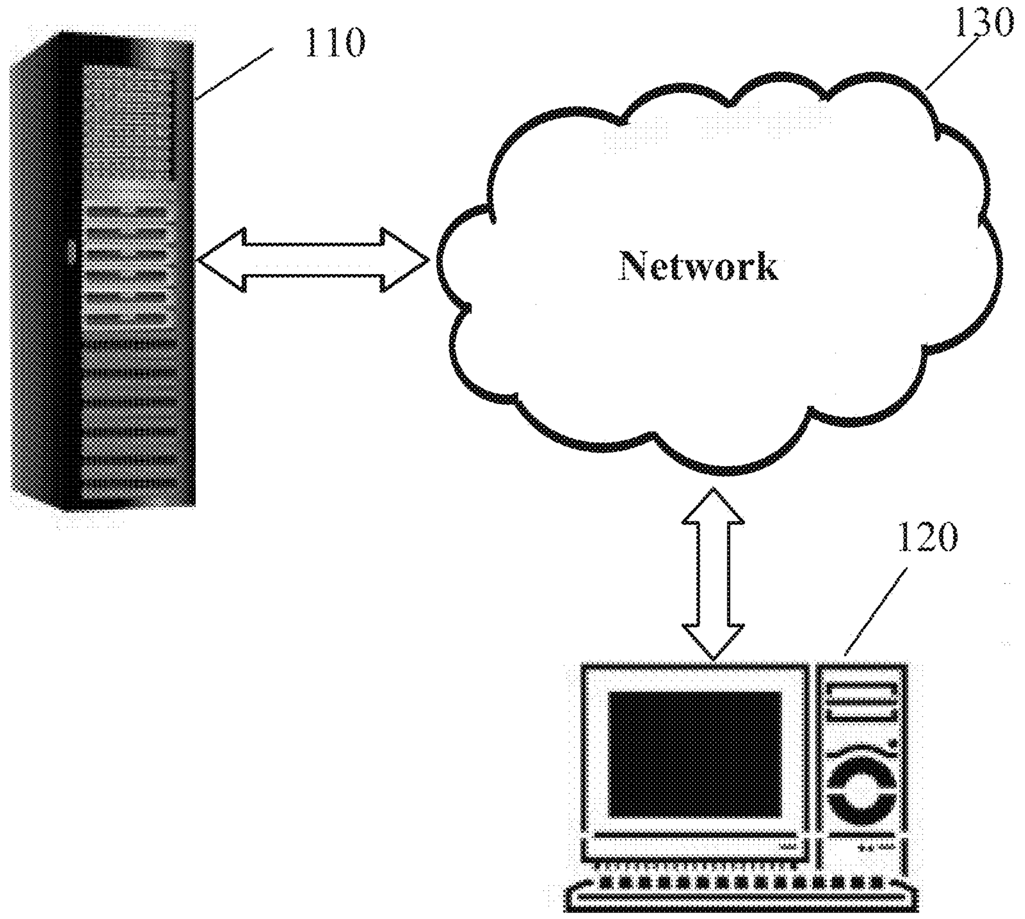
FIG. 1 is a schematic diagram of an application scenario of a method for compressing a topology recognition model according to an embodiment of the present disclosure.

FIG. 1 shows an application scenario of a method for compressing a topology recognition model according to an embodiment of the present disclosure.

As shown in FIG. 1, a server 110, a terminal 120, and a network 130 are included in the application scenario.

In some embodiments, data or information can be exchanged between the server 110 and the terminal 120 through the network 130. For example, the server 110 may obtain information and/or data from the terminal 120 through the network 130, or may send information and/or data to the terminal 120 through the network 130.

The terminal 120 is an IOTIPS terminal device on which a topology recognition model needs to be deployed. In some embodiments, the terminal 120 may receive a compressed convolutional network model from the server 110 and execute a prediction task locally by a compressed topology recognition model. The terminal 120 may be one or any combination of devices with an input and/or output function, such as a mobile device and a tablet.

In some embodiments, the server 110 can prune a to-be-compressed model to obtain a pruned model, and train the pruned model to obtain a trained pruned model. In some embodiments, the server 110 can quantify a bit quantity of a weight parameter of each neural network layer in the trained pruned model from a first bit quantity to a second bit quantity to obtain a highly-quantified pruned model, and train the highly-quantified pruned model to obtain a trained highly-quantified pruned model. The server 110 may be a single server or a server group. The server group may be centralized, distributed (for example, the server 110 may be a distributed system), dedicated, or provided by another device or system simultaneously. In some embodiments, the server 110 may be regional or remote. In some embodiments, the server 110 may be implemented on a cloud platform, or may be provided in a virtual manner. For example only, the cloud platform may include a private cloud, a public cloud, a hybrid cloud, a community cloud, a distributed cloud, an internal cloud, a multilayer cloud, or the like, or any combination thereof.

In some embodiments, the network 130 may be any one or more of wired or wireless networks. For example, the network 130 may be a local area network (LAN), a wide area network (WAN), a wireless local area network (WLAN), a metropolitan area network (MAN), or any combination thereof.

Figure 2:
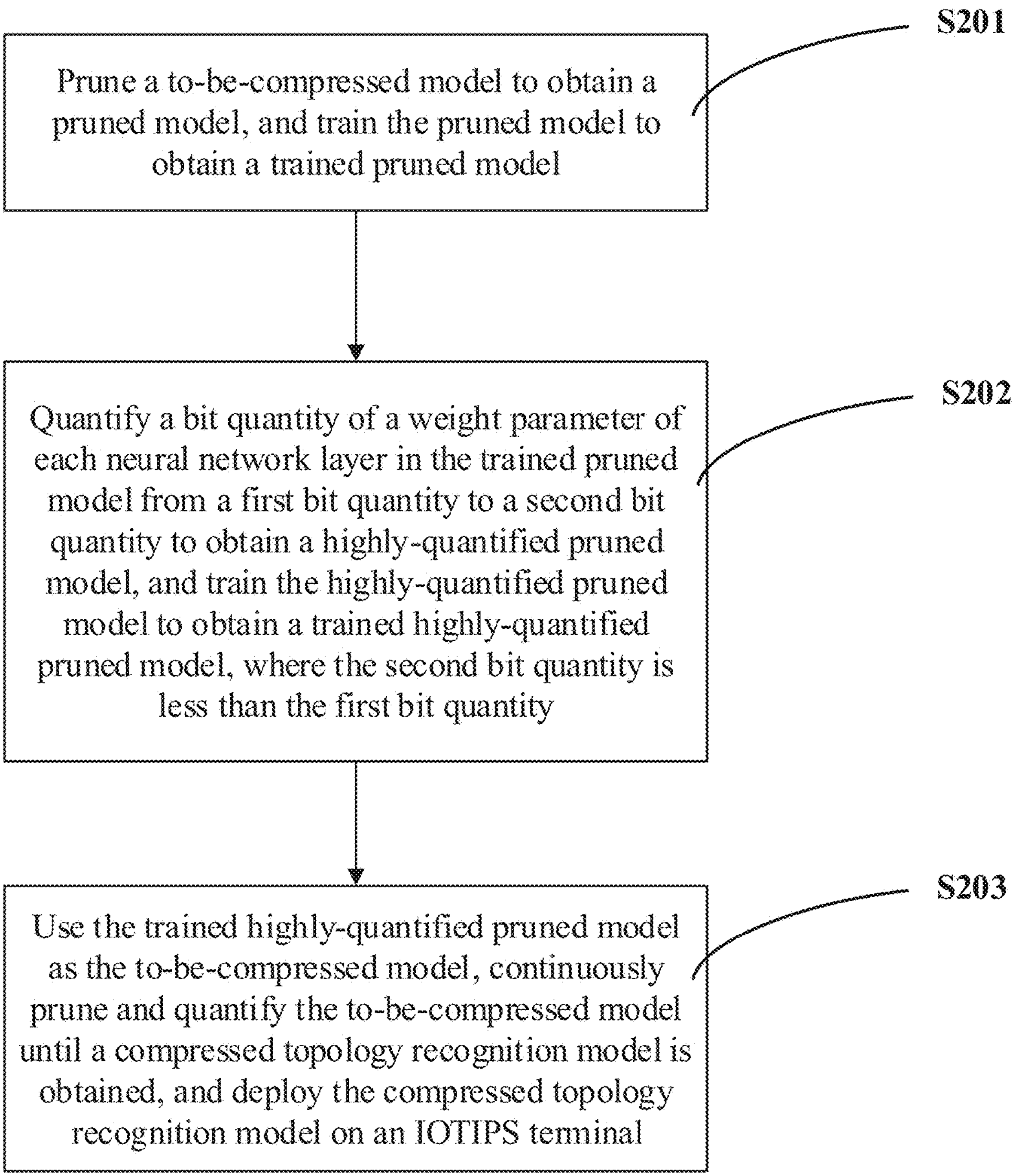
FIG. 2 is an example flowchart of a method for compressing a topology recognition model according to an embodiment of the present disclosure.

FIG. 2 is an example flowchart of a method for compressing a topology recognition model according to an embodiment of the present disclosure. As shown in FIG. 2, the method for compressing a topology recognition model includes following steps S201 to S203:

S201: Prune a to-be-compressed model to obtain a pruned model, and train the pruned model to obtain a trained pruned model.

The to-be-compressed model is a deep neural network model that needs to be compressed. In some embodiments, the to-be-compressed model may be a pre-trained topology recognition model. The topology recognition model is a machine learning model running on a server to recognize a topological structure of a power grid. The topology recognition model can be constructed based on a convolutional neural network model. An input of the topology recognition model may be voltage and current data of a low-voltage area of a supply transformer, and an output may be a position of each electricity meter in a supply transformer area and a correlation relationship between all electricity meters. In a specific implementation process, prediction accuracy of the topology recognition model can be specified, and the topology recognition is trained by a training dataset, to determine a parameter of the topology recognition model. A trained topology recognition model is used as the to-be-compressed model to ensure that decreased accuracy of the to-be-compressed model is within a predicted range, and the to-be-compressed model is compressed. Training data in the training dataset may be historical voltage and current data of the low-voltage area of the supply transformer, and a label of the training data may be a position of each electricity meter in a supply transformer area corresponding to the historical voltage and current data, and a correlation relationship between all electricity meters.

The to-be-compressed model has high recognition accuracy and a large quantity of redundant weight parameters. In a process of processing input data in the to-be-compressed model, not all weight parameters participate in effective calculation and have an impact on a prediction result. The pruning method reduces a size and computational complexity of a network of the to-be-compressed model by removing a redundant weight parameter, channel, or network layer from a network structure of the to-be-compressed model.

In some embodiments, the redundant channel of the to-be-compressed model is determined through sparse regularization training, and removed from the to-be-compressed model to obtain the pruned model. Sparse means elimination of some features in data to generalize the model and reduce a probability of overfitting. A regularizer is used to narrow a solving scope by adding some rules (restrictions) to a to-be-trained objective function. In a specific implementation process, a BN (Batch Normalization) layer scaling factor can be introduced as a numerical representation of an activation degree of a corresponding channel. A proportionality factor of the redundant channel is reduced through the sparse regularization training, and the redundant channel is removed by setting a threshold. Specific steps are as follows:

1. Perform L1 regularization training on convolutional and BN layers of the model to obtain a convolutional neural network with sparse weight parameter values.
2. Determine importance of each network layer in the convolutional neural network based on filter sparsity and the BN layer scaling factor.
3. Perform structured pruning on a sparse filter and a corresponding connection.

An intermediate network layer of the convolutional neural network includes lots of important information related to a prediction task. A correlation between any intermediate layer of the convolutional neural network and an adjacent network layer of the any intermediate layer is analyzed to achieve more accurate pruning while maintaining recognition accuracy.

In some embodiments, a fully connected layer can be used as a linear classifier, and recognition accuracy of each neural network layer in the-be-compressed model is obtained by the linear classifier. If a difference between recognition accuracy of any two adjacent neural network layers in the to-be-compressed model is less than a preset difference threshold, a neural network layer with the lower recognition accuracy in the any two adjacent neural network layers is removed. In a specific implementation process, any two adjacent neural network layers may be selected from the to-be-compressed model, and one of the any two adjacent neural network layers is removed to obtain a neural network layer accuracy prediction model; and the neural network layer accuracy prediction model is tested by a labeled prediction dataset, to obtain output accuracy of the neural network layer accuracy prediction model, and the output accuracy is used as recognition accuracy of an unremoved neural network layer in the any two adjacent neural network layers.

Figure 3:
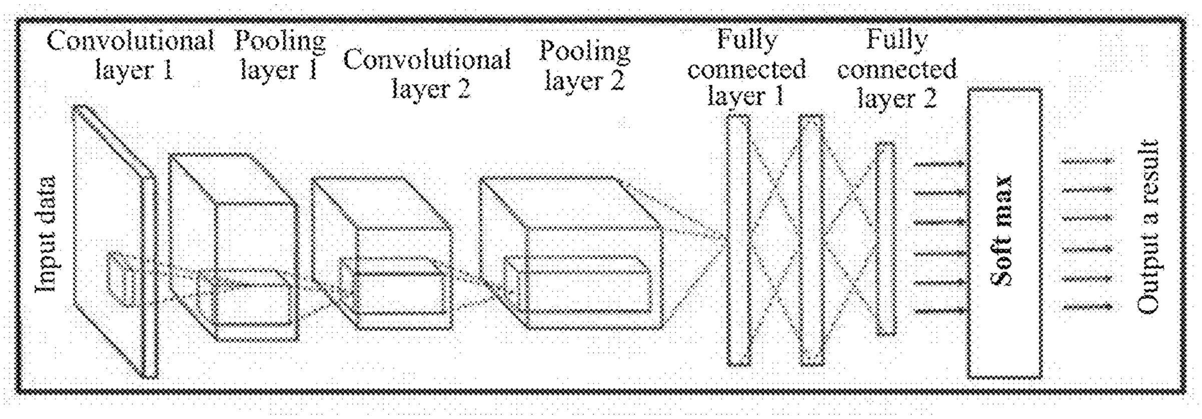
FIG. 3 is an example schematic diagram of a to-be-compressed model according to an embodiment of the present disclosure.

As an example only, as shown in FIG. 3, the to-be-compressed model (namely, the topology recognition model) is constructed based on the convolutional neural network model. The to-be-compressed model includes a plurality of convolutional layers (the to-be-compressed model actually includes many convolutional network layers, and only convolutional layers 1 and 2 are shown for convenience of description) and a plurality of fully connected layers. The fully connected layer (such as a fully connected layer 1) of the topology recognition model can be used as the linear classifier to evaluate effectiveness of each convolutional layer (such as the convolutional layers 1 and 2). An adaptive average pooling algorithm is used to unify an embedding vector length of each convolutional layer, such that convolutional layers with different characteristics output feature maps of a same size. For example, the convolution layer 1 may be removed, and then the linear classifier is fine-tuned layer by layer by a backpropagation algorithm to obtain best recognition accuracy for each layer. A topology recognition model at this time is used as the neural network layer accuracy prediction model, and a plurality of pieces of test data in a labeled test dataset is separately input into the neural network layer accuracy prediction model to obtain a plurality of test results. Based on the plurality of test results and labels corresponding to the plurality of pieces of test data in the test dataset, prediction accuracy of the neural network layer accuracy prediction model can be obtained, which is used as recognition accuracy of the convolutional layer 2. Recognition accuracy of the convolution layer 1 can be obtained according to the method in the above example. Then a subtraction operation is performed on the recognition accuracy of the convolutional layer 1 and the recognition accuracy of the convolutional layer 2, and whether an absolute value of an operation result is less than the preset difference threshold is determined. If the absolute value of the operation result is less than the preset difference threshold, it indicates that an impact of one of the convolutional layer 1 and the convolutional layer 2 on a final prediction result of the topology recognition model can be ignored. Therefore, a convolutional layer with the lower recognition accuracy in the convolutional layer 1 and the convolutional layer 2 is removed.

The above pruning process of the to-be-compressed model may result in a loss of some effective information, thereby decreasing performance of the pruned model. In some embodiments of the present disclosure, a knowledge distillation technology is introduced to obtain a distillation loss by comparing the to-be-compressed model (the trained topology recognition model) with the pruned model, establish a loss function, and guide the pruned model by the to-be-compressed model, thereby effectively improving the performance of the pruned model.

In some embodiments, the to-be-compressed model can be used to label training data in an unlabeled training dataset to obtain the training dataset. In a specific implementation process, the training data is input into the to-be-compressed model, an output result of the to-be-compressed model is used as a label of the training data, and the training data and the label of the training data are used as a group of training data in the training dataset.

In some embodiments, the pruned model can be trained by the training dataset obtained according to the above method, to obtain the trained pruned model. In a specific implementation process, a loss value can be obtained by the loss function (for example, a quadratic loss function) based on an output of the pruned model and the label of the training data in the training dataset; whether the loss function converges is determined based on the loss value (for example, whether the loss value is less than a preset threshold is determined); and if the loss function converges, the training is stopped; or if the loss function does not converge, a parameter of the pruned model is adjusted, and a next training is proceeded with until the loss function converges or a number of training iterations reaches a preset threshold of the training iterations.

In some embodiments, if the number of training iterations reaches the preset threshold of the training iterations and the loss function does not converge, it indicates that the pruning processing affects accuracy of the to-be-compressed model. In this case, a channel or a neural network layer can be added to the pruned model with reference to the to-be-compressed model. In a specific implementation process, a channel or neural network layer that is pruned from the to-be-compressed model can be gradually added to the pruned model. After the channel or the neural network layer is added each time, the model is trained as above until the loss function converges in the training process. Then, a pruned model when the loss function converges is used as the trained pruned model.

S202: Quantify a bit quantity of a weight parameter of each neural network layer in the trained pruned model from a first bit quantity to a second bit quantity to obtain a highly-quantified pruned model, and train the highly-quantified pruned model to obtain a trained highly-quantified pruned model, where the second bit quantity is less than the first bit quantity.

Model quantification is a compression method that approximates some similar weight parameters of the deep neural network model to a same numerical value, and compresses and accelerates the model by reducing a bit-width representation of the weight parameter to keep accuracy and performance of the model basically unchanged while reducing a size of the model and increasing a computational speed. A bitwidth of the weight parameter of the model can be represented by the bit quantity, and the bit quantity of the weight parameter may be a power of 2, such as 1, 2, 4, 8, 16, or 32. A weight parameter of a deep learning model is usually 32 bits. A high bit quantity means that the model can achieve high recognition accuracy, while the model has a large volume, a slow inference speed, and consumes more hardware resources.

In some embodiments, the weight parameter of each neural network layer in the pruned model can be gradually quantified. Firstly, the weight parameter of each neural network layer in the pruned model is quantified to a large bit quantity, and then the large bit quantity is further quantified to a small bit quantity, and so on, until the compression task is completed.

In a specific implementation process, a bit quantity of the weight parameter of each neural network layer in the pruned model can be quantified from the first bit quantity to the second bit quantity, and the pruned model is trained; a bit quantity of a weight parameter of a fully connected layer of the pruned model is quantified from the first bit quantity to the second bit quantity, and the pruned model is trained; and an activation function of the pruned model is quantified to obtain the highly-quantified pruned model. For example, a bit quantity of the weight parameters of each neural network layer and the fully connected layer in the pruned model may be quantified from 32 bits to 16 bits. In a specific implementation process, at least one neural network layer can be selected from the pruned model by a preset algorithm successively, and a bit quantity of a weight parameter of the at least one neural network layer is quantified from the first bit quantity to the second bit quantity. The preset algorithm may include but is not limited to a random strategy, a pruning-based strategy, and the like. The random strategy is to randomly divide weight parameters into disjoint parts, in other words, to group the weight parameters with an equal probability. The pruning-based strategy is to determine a threshold for each layer layer by layer (the threshold is usually given based on a splitting ratio), compare an absolute value of a weight parameter with the threshold, and divide weight parameters into non-overlapping groups.

After the highly-quantified pruned model is obtained according to the above method, the highly-quantified pruned model can be trained to obtain the trained highly-quantified pruned model.

In the embodiments of the present disclosure, an idea of knowledge distillation is introduced to train a high-bit quantification model. The pruned model and the highly-quantified pruned model have an identical backbone, except for different parameters and activation functions. The highly-quantified pruned model can be divided into different parts, and a plurality of parts can be selected to construct the loss function as a constraint function to constrain accuracy of a quantification result. For a network layer that does not meet an accuracy requirement, the weight parameter of the pruned model is used to guide a weight parameter of the highly-quantified pruned model, compensate for a decrease in model accuracy caused by the quantification process, and improve accuracy of the highly-quantified pruned model.

Figure 4:
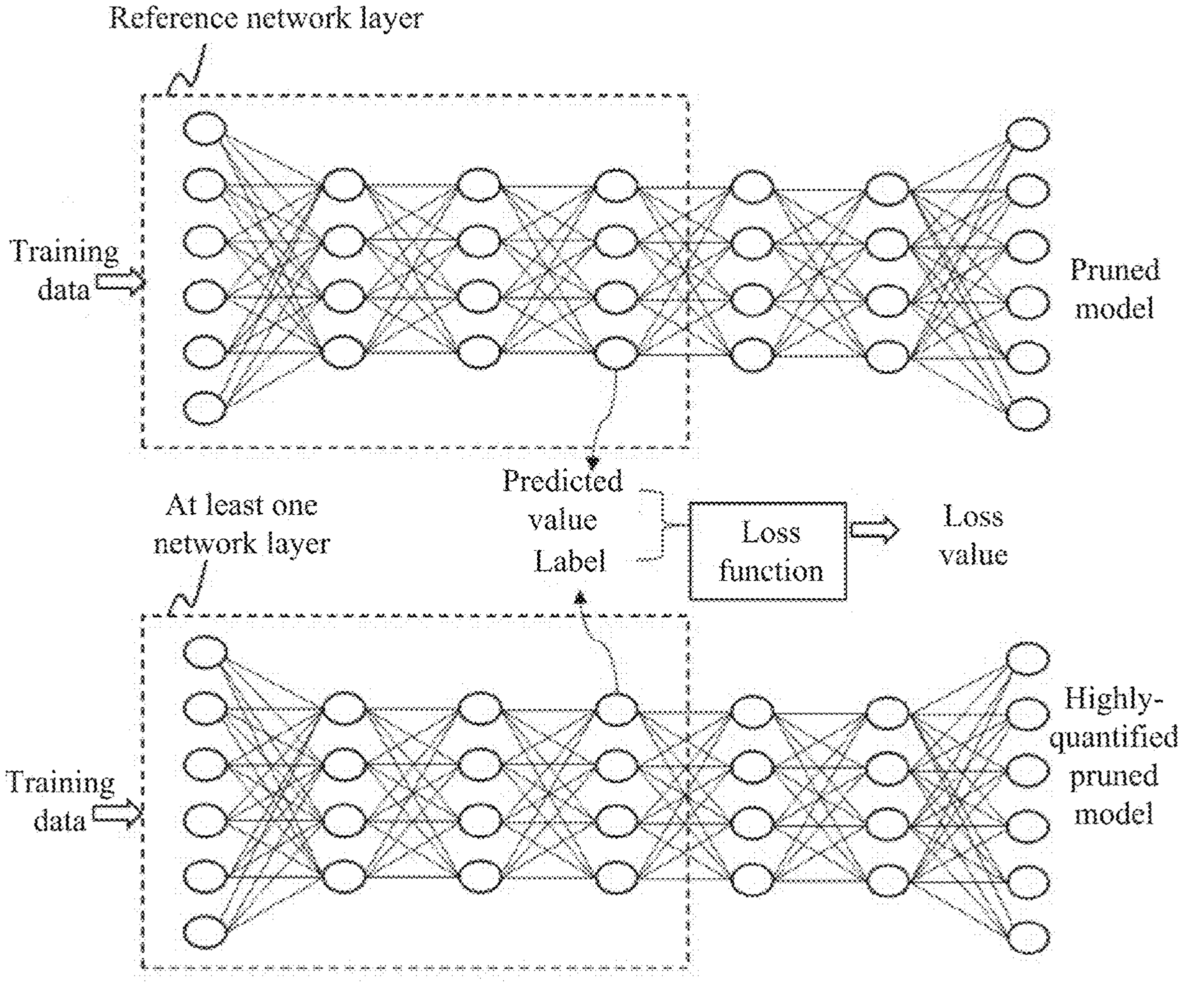
FIG. 4 is an example schematic diagram of training a highly-quantified pruned model with reference to a pruned model according to an embodiment of the present disclosure.

In some embodiments, as shown in FIG. 4, at least one neural network layer can be selected from the highly-quantified pruned model to construct the loss function (for example, an absolute value loss function), and the pruned model is used to label the training data in the unlabeled training dataset to obtain a training dataset. In a specific implementation process, as shown in FIG. 4, the training data is input into the pruned model, and an output of a reference network layer in the pruned model is used as a label of the training data, where the reference network layer corresponds to the at least one selected neural network layer in the highly-quantified pruned model; and the training data and the label of the training data are used as a group of training data in the training dataset.

After the training dataset is obtained, the highly-quantified pruned model can be trained based on the loss function and the training dataset to obtain the trained highly-quantified pruned model.

In a specific implementation process, as shown in FIG. 4, a loss value can be obtained by the loss function based on a predicted value of an output of the at least one neural network layer in the highly-quantified pruned model and a label of the training data in the training dataset; whether the loss function converges is determined based on the loss value; and if the loss function converges, the training is stopped; or if the loss function does not converge, a parameter of the highly-quantified pruned model is adjusted, and a next training is proceeded with until the loss function converges or the number of training iterations reaches the preset threshold of the training iterations.

In some embodiments, if the number of training iterations reaches the preset threshold of the training iterations and the loss function does not converge, it indicates that the above quantification process has a large impact on accuracy of the pruned model. In this case, a bit quantity of at least one weight parameter of the highly-quantified pruned model can be increased from the second bit quantity to the first bit quantity with reference to the weight parameter of the neural network layer in the pruned model. After the weight parameter of the highly-quantified pruned model is adjusted with reference to the pruned model, it is necessary to continue training the highly-quantified pruned model until the loss function converges in the training process. Therefore, a highly-quantified pruned model when the loss function converges will be used as the trained highly-quantified pruned model.

Step S203: Use the trained highly-quantified pruned model as the to-be-compressed model, continuously prune and quantify the to-be-compressed model until a compressed topology recognition model is obtained, and deploy the compressed topology recognition model on an IOTIPS terminal.

In some embodiments, after the trained highly-quantified pruned model is obtained upon the step S202, the trained highly-quantified pruned model can be used as the to-be-compressed model, and the to-be-compressed model is continuously pruned and quantified according to the steps S201 and S202 until the compressed topology recognition model is obtained. The compressed topology recognition model may be a topology recognition model that meets preset model indicators, and the compressed topology recognition model can be deployed on the IOTIPS terminal. The topology recognition model samples and monitors a power cable to recognize a topology feature signal, mainly including a voltage, a current, an electricity quantity, and other information. The model obtains topology recognition feature information, which can be used to recognize a physical topology in a distribution area. The preset model indicators include a compression ratio, a computation amount, a thrust delay, an accuracy loss, and the like.

In the embodiments of the present disclosure, the compressed topology recognition model is applied to a line and topology node perception system of a low-voltage distribution network. The line and topology node perception system of the low-voltage distribution network mainly includes two on-site sensing devices: a master terminal disposed on a distribution transformer of a transformer area, and a slave terminal disposed on a cable branch box and metering box. The slave terminal is provided with a current transformer. The apparatus recognizes and verifies a connection relationship between topology nodes in the low-voltage distribution network by a power frequency communication technology, a carrier communication technology, and a dynamic node perception algorithm. A basic principle of the apparatus is to utilize a characteristic that it is difficult to generate crosstalk for power frequency communication signal between transformer areas, and a slave host determines, based on a transformer area feature code sent from a master host, whether the slave host is in a same transformer area as the master host. A same approach is adopted for node recognition in the transformer area. The master terminal broadcasts a feature code to the transformer area. After receiving the feature code, the slave terminal determines whether the slave terminal belongs to the current transformer area. If the slave terminal belongs to the transformer area, the slave terminal registers with a network of the master terminal to obtain a list of all nodes in the transformer area. The master and slave terminals communicate with each other by a power line carrier technology.

Figure 5:
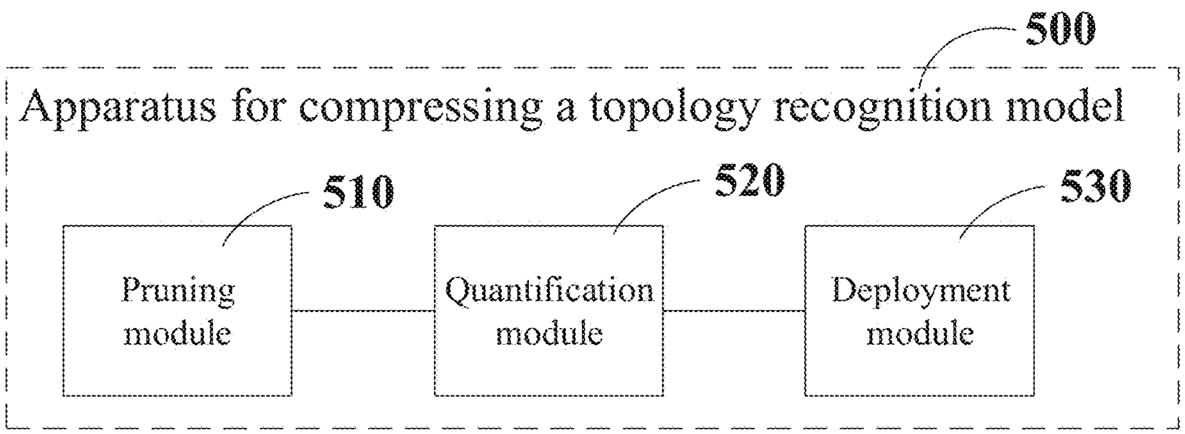
FIG. 5 is an example schematic diagram of an apparatus for compressing a topology recognition model according to an embodiment of the present disclosure.

FIG. 5 is a structural block diagram of an apparatus for compressing a topology recognition model according to an embodiment of the present disclosure. The apparatus can be implemented as part or all of an electronic device through software, hardware, or a combination thereof.

As shown in FIG. 5, the apparatus 500 for compressing a topology recognition model includes a pruning module 510, a quantification module 520, and a deployment module 530.

The pruning module 510 is configured to prune a to-be-compressed model to obtain a pruned model, and train the pruned model to obtain a trained pruned model, where the to-be-compressed model is a topology recognition model, and the topology recognition model is a machine learning model running on a server to recognize a topological structure of a power grid.

The quantification module 520 is configured to quantify a bit quantity of a weight parameter of each neural network layer in the trained pruned model from a first bit quantity to a second bit quantity to obtain a highly-quantified pruned model, and train the highly-quantified pruned model to obtain a trained highly-quantified pruned model, where the second bit quantity is less than the first bit quantity.

The deployment module 530 is configured to use the trained highly-quantified pruned model as the to-be-compressed model, continuously prune and quantify the to-be-compressed model until a compressed topology recognition model is obtained, and deploy the compressed topology recognition model on an IOTIPS terminal.

In some embodiments, a process of pruning a to-be-compressed model to obtain a pruned model includes: determining a redundant channel of the to-be-compressed model through sparse regularization training, and removing the redundant channel from the to-be-compressed model to obtain the pruned model.

In some embodiments, the apparatus further includes: a network layer recognition accuracy obtaining module configured to use a fully connected layer as a linear classifier, and obtain recognition accuracy of each neural network layer in the to-be-compressed model by the linear classifier; and a removal module configured to: if a difference between recognition accuracy of any two adjacent neural network layers in the to-be-compressed model is less than a preset difference threshold, remove a neural network layer with the lower recognition accuracy in the any two adjacent neural network layers.

In some embodiments, a process of using a fully connected layer as a linear classifier, and obtaining recognition accuracy of each neural network layer in the to-be-compressed model by the linear classifier includes: selecting any two adjacent neural network layers from the to-be-compressed model, and removing one of the any two adjacent neural network layers to obtain a neural network layer accuracy prediction model; and testing the neural network layer accuracy prediction model by a labeled prediction dataset, to obtain output accuracy of the neural network layer accuracy prediction model, and using the output accuracy as recognition accuracy of an unremoved neural network layer in the any two adjacent neural network layers.

In some embodiments, the training the pruned model to obtain a trained pruned model includes: using the to-be-compressed model to label training data in an unlabeled training dataset to obtain a training dataset; and training the pruned model by the training dataset, to obtain the trained pruned model.

In some embodiments, the using the to-be-compressed model to label training data in an unlabeled training dataset to obtain a training dataset includes: inputting the training data into the to-be-compressed model, and using an output result of the to-be-compressed model as a label of the training data; and using the training data and the label of the training data as a group of training data in the training dataset.

In some embodiments, the training the pruned model by the training dataset, to obtain the trained pruned model includes: obtaining a loss value by a loss function based on an output of the pruned model and a label of training data in the training dataset; determining, based on the loss value, whether the loss function converges; and if the loss function converges, stop the training; or if the loss function does not converge, adjusting a parameter of the pruned model, and proceeding with a next training until the loss function converges or a number of training iterations reaches a preset threshold of the training iterations.

In some embodiments, the apparatus further includes: a channel or network layer adding module configured to: if the number of training iterations reaches the preset threshold of the training iterations and the loss function does not converge, add a channel or a neural network layer to the pruned model with reference to the to-be-compressed model.

In some embodiments, a process of quantifying a bit quantity of a weight parameter of each neural network layer in the trained pruned model from a first bit quantity to a second bit quantity to obtain a highly-quantified pruned model includes: quantifying a bit quantity of a weight parameter of each neural network layer in the pruned model from the first bit quantity to the second bit quantity, and training the pruned model; quantifying a bit quantity of a weight parameter of a fully connected layer of the pruned model from the first bit quantity to the second bit quantity, and training the pruned model; and quantifying an activation function of the pruned model to obtain the highly-quantified pruned model.

In some embodiments, a process of training the highly-quantified pruned model to obtain a trained highly-quantified pruned model includes: selecting at least one neural network layer from the highly-quantified pruned model to construct a loss function; using the pruned model to label training data in an unlabeled training dataset to obtain a training dataset; and training the highly-quantified pruned model based on the loss function and the training dataset to obtain the trained highly-quantified pruned model.

In some embodiments, the using the pruned model to label training data in an unlabeled training dataset to obtain a training dataset includes: inputting the training data into the pruned model, and using an output of a reference network layer in the pruned model as a label of the training data, where the reference network layer corresponds to the at least one selected neural network layer in the highly-quantified pruned model; and using the training data and the label of the training data as a group of training data in the training dataset.

In some embodiments, the training the highly-quantified pruned model based on the loss function and the training dataset to obtain the trained highly-quantified pruned model includes: obtaining a loss value by the loss function based on an output of the at least one neural network layer of the highly-quantified pruned model and a label of training data in the training dataset; determining, based on the loss value, whether the loss function converges; and if the loss function converges, stopping the training; or if the loss function does not converge, adjusting a parameter of the highly-quantified pruned model, and proceeding with a next training until the loss function converges or a number of training iterations reaches a preset threshold of the training iterations.

In some embodiments, the apparatus further includes: an inverse quantification module configured to: if the number of training iterations reaches the preset threshold of the training iterations and the loss function does not converge, increase a bit quantity of at least one weight parameter of the highly-quantified pruned model from the second bit quantity to the first bit quantity with reference to a weight parameter of the neural network layer in the pruned model.

In some embodiments, the quantifying a bit quantity of a weight parameter of each neural network layer in the pruned model from the first bit quantity to the second bit quantity includes: selecting at least one neural network layer from the pruned model by a preset algorithm successively, and quantifying a bit quantity of a weight parameter of the at least one neural network layer from the first bit quantity to the second bit quantity.

In the embodiments of the present disclosure, the above apparatus for compressing a topology recognition model includes a processor. The processor is configured to execute the above program modules stored in a memory, including the pruning module 510, the quantification module 520, the deployment module 530, the network layer recognition accuracy obtaining module, the removal module, the network layer addition module, and the inverse quantification module.

In the embodiments of the above apparatus for compressing a topology recognition model, for specific processing of each module and a corresponding technical effect, reference may be made to the relevant description in the corresponding method embodiment, and details are not described herein again.

The embodiments of the present disclosure further provide a chip. The chip includes the above apparatus for compressing a topology recognition model. The apparatus can be implemented as part or all of the chip through software, hardware, or a combination thereof.

Figure 6:
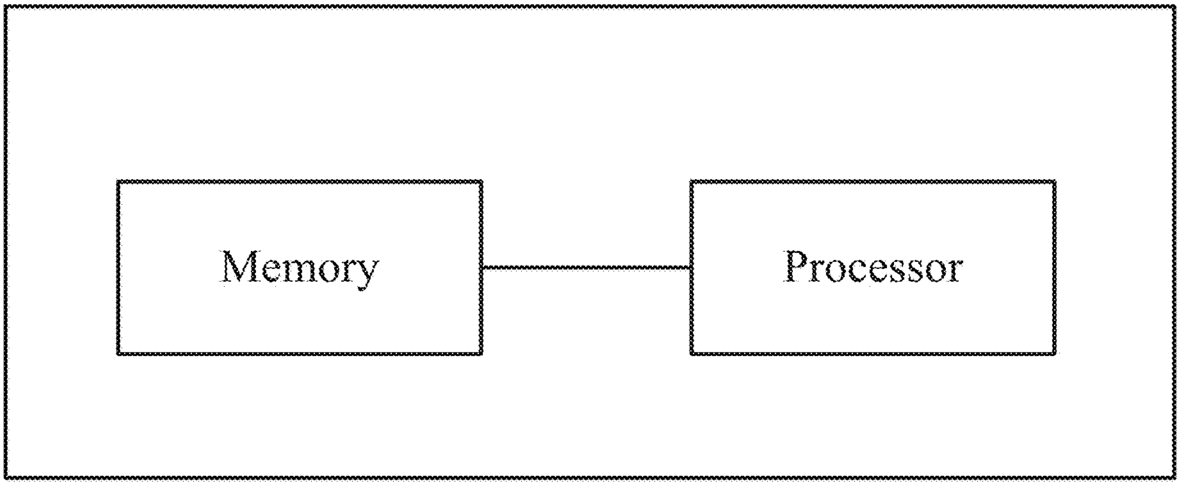
FIG. 6 is a structural block diagram of an electronic device according to an embodiment of the present disclosure.

The present disclosure further provides an electronic device. FIG. 6 is a structural block diagram of an electronic device according to an embodiment of the present disclosure.

As shown in FIG. 6, the electronic device includes a memory and a processor. The memory is configured to store at least one computer instruction, and the at least one computer instruction is executed by the processor to implement the method described according to the embodiments of the present disclosure.

Figure 7:
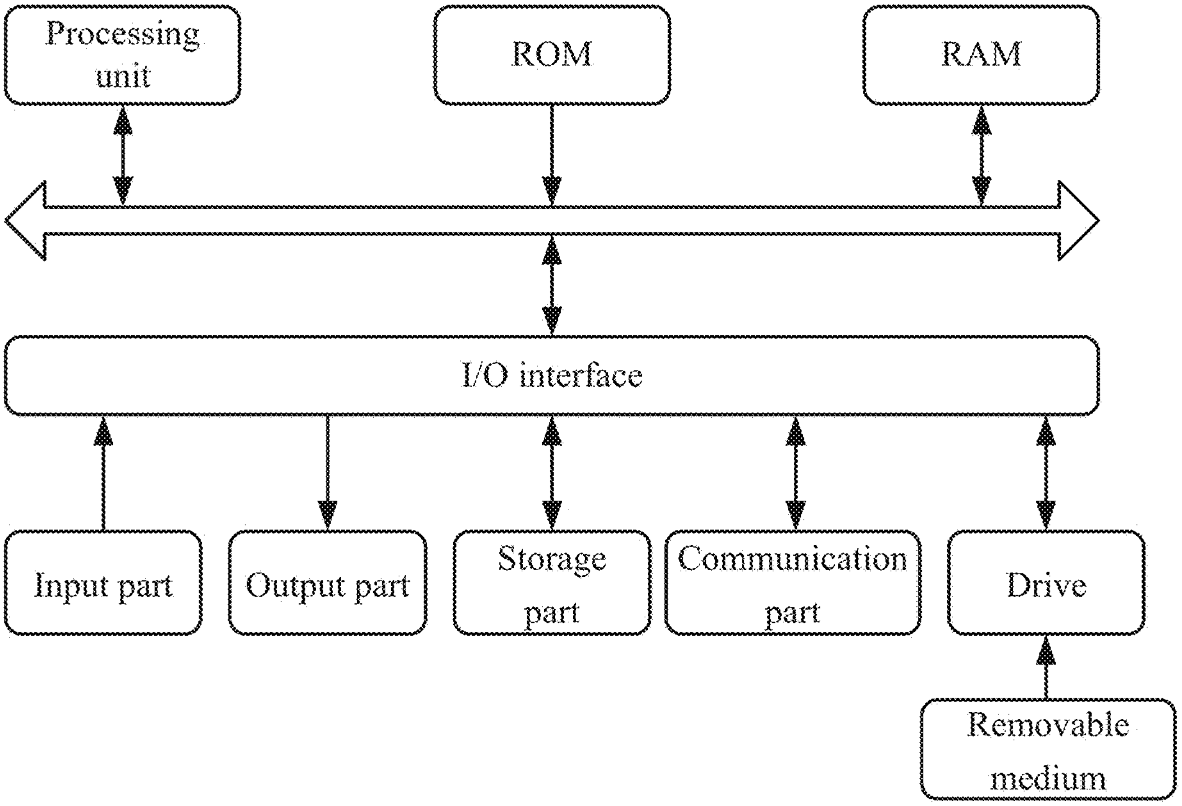
FIG. 7 is a schematic structural diagram of a computer system for implementing a method according to the embodiments of the present disclosure.

FIG. 7 is a schematic structural diagram of a computer system for implementing a method according to the embodiments of the present disclosure.

As shown in FIG. 7, the computer system includes a processing unit, which can execute various methods in the above embodiments according to a program stored in a read-only memory (ROM) or a program loaded from a storage part to a random access memory (RAM). The RAM further stores various programs and data required for operations of the computer system. The processing unit, the ROM, and the RAM are connected to each other through a bus. An input/output (I/O) interface is also connected to the bus.

The following components are connected to the I/O interface: an input part including a keyboard, a mouse, and the like; an output part including a cathode-ray tube (CRT), a liquid crystal display (LCD), a loudspeaker, and the like; a storage part including a hard disk and the like; and a communication part including a network interface card such as a local area network (LAN) card or a modem. The communication part performs a communication process through a network such as the Internet. A drive is also connected to the I/O interface as needed. A removable medium, such as a magnetic disk, an optical disk, a magneto-optical disk, or a semiconductor memory, is mounted on the drive as needed, such that a computer program read therefrom is installed into the storage part as needed. The processing unit may be implemented as a processing unit such as a central processing unit (CPU), a graphics processing unit (GPU), a tensor processing unit (TPU), a field programmable gate array (FPGA), or a network processing unit (NPU).

Particularly, according to the embodiments of the present disclosure, the method described above may be implemented as a computer software program. For example, the embodiments of the present disclosure include a computer program product including a computer program tangibly carried by a computer-readable medium. The computer program includes a program code for executing the method described above. In these embodiments, the computer program may be downloaded from a network by means of the communication part and installed, and/or be installed from the removable medium.

The flowcharts and block diagrams in the accompanying drawings illustrate architectures, functions, and operations of possible implementations of the system, method, and computer program product according to various embodiments of the present disclosure. Each block in the flowcharts or block diagrams may represent a module, a program segment, or a part of code, and the module, the program segment, or the part of code contains at least one executable instruction used to implement a specified logical function. It should also be noted that, in some alternative implementations, the functions marked in the blocks may alternatively occur in a different order from that marked in the accompanying drawings. For example, two successively shown blocks actually may be executed in parallel substantially, or may be executed in reverse order sometimes, depending on the functions involved. It should also be noted that each block in the block diagrams and/or flowcharts and combinations of the blocks in the flowcharts and/or block diagrams may be implemented by a dedicated hardware-based system for executing a specified function or operation, or may be implemented by a combination of dedicated hardware and computer instructions.

The units or modules described in the embodiments of the present disclosure may be implemented in a form of software or in a form of programmable hardware. The described units or modules may alternatively be disposed in a processor, and names of these units or modules do not constitute a limitation on the units or modules in a certain situation.

In another aspect, the present disclosure further provides a computer-readable storage medium. The computer-readable storage medium may be included in the electronic device or computer system described in the foregoing embodiments; or may exist alone without being assembled into the device. The computer-readable storage medium stores at least one program. The at least one program is executed by at least one processor to execute the method described in the present disclosure.

The above description is merely an illustration of preferred embodiments of the present disclosure and the technical principle in use. Those skilled in the art should understand that, the scope of invention of the present disclosure is not limited to the technical solution formed by a specific combination of the foregoing technical features, but should cover other technical solutions formed by any combination of the foregoing technical features or equivalent features thereof without departing from the foregoing inventive concept, for example, a technical solution formed by replacing the foregoing feature with a technical feature having a similar function disclosed in (but not limited to) the present disclosure.

The invention claimed is:

1. A method for compressing a topology recognition model, wherein the method comprises:

pruning a to-be-compressed model to obtain a pruned model, and training the pruned model to obtain a trained pruned model, wherein if a number of training iterations reaches a preset threshold of the training iterations and a loss function does not converge, a channel or a neural network layer is added to the pruned model with reference to the to-be-compressed model, the to-be-compressed model is a topology recognition model, and the topology recognition model is a machine learning model running on a server to recognize a topological structure of a power grid;

quantifying a bit quantity of a weight parameter of each neural network layer in the trained pruned model from a first bit quantity to a second bit quantity to obtain a highly-quantified pruned model, and training the highly-quantified pruned model to obtain a trained highly-quantified pruned model, wherein the second bit quantity is less than the first bit quantity; and for a neural network layer that does not meet an accuracy requirement, performing instructional training on a weight parameter of the highly-quantified pruned model based on a weight parameter of the pruned model; and using the trained highly-quantified pruned model as the to-be-compressed model, continuously pruning and quantifying the to-be-compressed model until a compressed topology recognition model is obtained, and deploying the compressed topology recognition model on an Internet of Things in Power Systems (IOTIPS) terminal, wherein the training the pruned model to obtain a trained pruned model comprises:

using the to-be-compressed model to label training data in an unlabeled training dataset to obtain a training dataset, wherein training data in the training dataset is historical voltage and current data of a low-voltage area of a supply transformer, and a label of the training data is a position of each electricity meter in a supply transformer area corresponding to the historical voltage and current data, and a correlation relationship between all electricity meters; and training the pruned model by the training dataset, to obtain the trained pruned model.

2. The method according to claim 1, wherein the pruning a to-be-compressed model to obtain a pruned model comprises:

determining a redundant channel of the to-be-compressed model through sparse regularization training, and removing the redundant channel from the to-be-compressed model to obtain the pruned model.

3. The method according to claim 2, further comprising:

using a fully connected layer as a linear classifier, and obtaining recognition accuracy of each neural network layer in the to-be-compressed model by the linear classifier; and if a difference between recognition accuracy of any two adjacent neural network layers in the to-be-compressed model is less than a preset difference threshold, removing a neural network layer with the lower recognition accuracy in the any two adjacent neural network layers.

4. The method according to claim 3, wherein the using a fully connected layer as a linear classifier, and obtaining recognition accuracy of each neural network layer in the to-be-compressed model by the linear classifier comprises:

selecting any two adjacent neural network layers from the to-be-compressed model, and removing one of the any two adjacent neural network layers to obtain a neural network layer accuracy prediction model; and testing the neural network layer accuracy prediction model by a labeled prediction dataset, to obtain output accuracy of the neural network layer accuracy prediction model, and using the output accuracy as recognition accuracy of an unremoved neural network layer in the any two adjacent neural network layers.

5. The method according to claim 1, wherein the using the to-be-compressed model to label training data in an unlabeled training dataset to obtain a training dataset comprises:

inputting the training data into the to-be-compressed model, and using an output result of the to-be-compressed model as a label of the training data; and using the training data and the label of the training data as a group of training data in the training dataset.

6. The method according to claim 1, wherein the training the pruned model by the training dataset, to obtain the trained pruned model comprises:

obtaining a loss value by the loss function based on an output of the pruned model and the label of the training data in the training dataset;

determining, based on the loss value, whether the loss function converges; and if the loss function converges, stop the training; or if the loss function does not converge, adjusting a parameter of the pruned model, and proceeding with a next training until the loss function converges or the number of training iterations reaches the preset threshold of the training iterations.

7. The method according to claim 1, wherein the quantifying a bit quantity of a weight parameter of each neural network layer in the trained pruned model from a first bit quantity to a second bit quantity to obtain a highly-quantified pruned model comprises:

quantifying a bit quantity of a weight parameter of each neural network layer in the pruned model from the first bit quantity to the second bit quantity, and training the pruned model;

quantifying a bit quantity of a weight parameter of a fully connected layer of the pruned model from the first bit quantity to the second bit quantity, and training the pruned model; and quantifying an activation function of the pruned model to obtain the highly-quantified pruned model.

8. The method according to claim 1, wherein the training the highly-quantified pruned model to obtain a trained highly-quantified pruned model comprises:

selecting at least one neural network layer from the highly-quantified pruned model to construct the loss function;

using the pruned model to label the training data in the unlabeled training dataset to obtain a training dataset; and training the highly-quantified pruned model based on the loss function and the training dataset to obtain the trained highly-quantified pruned model.

9. The method according to claim 8, wherein the using the pruned model to label the training data in the unlabeled training dataset to obtain a training dataset comprises:

inputting the training data into the pruned model, and using an output of a reference network layer in the pruned model as a label of the training data, wherein the reference network layer corresponds to the at least one selected neural network layer in the highly-quantified pruned model; and using the training data and the label of the training data as a group of training data in the training dataset.

10. The method according to claim 8, wherein the training the highly-quantified pruned model based on the loss function and the training dataset to obtain the trained highly-quantified pruned model comprises:

obtaining a loss value by the loss function based on an output of the at least one neural network layer of the highly-quantified pruned model and a label of training data in the training dataset;

determining, based on the loss value, whether the loss function converges; and if the loss function converges, stop the training; or if the loss function does not converge, adjusting a parameter of the highly-quantified pruned model, and proceeding with a next training until the loss function converges or the number of training iterations reaches the preset threshold of the training iterations.

11. The method according to claim 10, further comprising:

if the number of training iterations reaches the preset threshold of the training iterations and the loss function does not converge, increasing a bit quantity of at least one weight parameter of the highly-quantified pruned model from the second bit quantity to the first bit quantity with reference to a weight parameter of the neural network layer in the pruned model.

12. The method according to claim 7, wherein the quantifying a bit quantity of a weight parameter of each neural network layer in the pruned model from the first bit quantity to the second bit quantity comprises:

selecting at least one neural network layer from the pruned model by a preset algorithm successively, and quantifying a bit quantity of a weight parameter of the at least one neural network layer from the first bit quantity to the second bit quantity.

13. An apparatus for compressing a topology recognition model, wherein the apparatus comprises:

a pruning module configured to prune a to-be-compressed model to obtain a pruned model, and train the pruned model to obtain a trained pruned model, wherein if a number of training iterations reaches a preset threshold of the training iterations and a loss function does not converge, a channel or a neural network layer is added to the pruned model with reference to the to-be-compressed model, the to-be-compressed model is a topology recognition model, and the topology recognition model is a machine learning model running on a server to recognize a topological structure of a power grid;

a quantification module configured to: quantify a bit quantity of a weight parameter of each neural network layer in the trained pruned model from a first bit quantity to a second bit quantity to obtain a highly-quantified pruned model, and train the highly-quantified pruned model to obtain a trained highly-quantified pruned model, wherein the second bit quantity is less than the first bit quantity; and for a neural network layer that does not meet an accuracy requirement, perform instructional training on a weight parameter of the highly-quantified pruned model based on a weight parameter of the pruned model; and a deployment module configured to use the trained highly-quantified pruned model as the to-be-compressed model, continuously prune and quantify the to-be-compressed model until a compressed topology recognition model is obtained, and deploy the compressed topology recognition model on an IOTIPS terminal, wherein a process of training the pruned model to obtain a trained pruned model comprises:

using the to-be-compressed model to label training data in an unlabeled training dataset to obtain a training dataset, wherein training data in the training dataset is historical voltage and current data of a low-voltage area of a supply transformer, and a label of the training data is a position of each electricity meter in a supply transformer area corresponding to the historical voltage and current data, and a correlation relationship between all electricity meters; and training the pruned model by the training dataset, to obtain the trained pruned model.

14. The apparatus according to claim 13, wherein a process of pruning a to-be-compressed model to obtain a pruned model comprises:

determining a redundant channel of the to-be-compressed model through sparse regularization training, and removing the redundant channel from the to-be-compressed model to obtain the pruned model.

15. The apparatus according to claim 14, further comprising:

a network layer recognition accuracy obtaining module configured to use a fully connected layer as a linear classifier, and obtain recognition accuracy of each neural network layer in the to-be-compressed model by the linear classifier; and a removal module configured to: if a difference between recognition accuracy of any two adjacent neural network layers in the to-be-compressed model is less than a preset difference threshold, remove a neural network layer with the lower recognition accuracy in the any two adjacent neural network layers.

16. The apparatus according to claim 15, wherein a process of using a fully connected layer as a linear classifier, and obtaining recognition accuracy of each neural network layer in the to-be-compressed model by the linear classifier comprises:

selecting any two adjacent neural network layers from the to-be-compressed model, and removing one of the any two adjacent neural network layers to obtain a neural network layer accuracy prediction model; and testing the neural network layer accuracy prediction model by a labeled prediction dataset, to obtain output accuracy of the neural network layer accuracy prediction model, and using the output accuracy as recognition accuracy of an unremoved neural network layer in the any two adjacent neural network layers.

17. The apparatus according to claim 13, wherein the using the to-be-compressed model to label training data in an unlabeled training dataset to obtain a training dataset comprises:

inputting the training data into the to-be-compressed model, and using an output result of the to-be-compressed model as a label of the training data; and using the training data and the label of the training data as a group of training data in the training dataset.

18. The apparatus according to claim 13, wherein the training the pruned model by the training dataset, to obtain the trained pruned model comprises:

obtaining a loss value by the loss function based on an output of the pruned model and the label of the training data in the training dataset;

determining, based on the loss value, whether the loss function converges; and if the loss function converges, stop the training; or if the loss function does not converge, adjusting a parameter of the pruned model, and proceeding with a next training until the loss function converges or the number of training iterations reaches the preset threshold of the training iterations.

19. The apparatus according to claim 13, wherein a process of quantifying a bit quantity of a weight parameter of each neural network layer in the trained pruned model from a first bit quantity to a second bit quantity to obtain a highly-quantified pruned model comprises:

quantifying a bit quantity of a weight parameter of each neural network layer in the pruned model from the first bit quantity to the second bit quantity, and training the pruned model;

quantifying a bit quantity of a weight parameter of a fully connected layer of the pruned model from the first bit quantity to the second bit quantity, and training the pruned model; and quantifying an activation function of the pruned model to obtain the highly-quantified pruned model.

20. The apparatus according to claim 13, wherein a process of training the highly-quantified pruned model to obtain a trained highly-quantified pruned model comprises:

selecting at least one neural network layer from the highly-quantified pruned model to construct the loss function;

using the pruned model to label the training data in the unlabeled training dataset to obtain a training dataset; and training the highly-quantified pruned model based on the loss function and the training dataset to obtain the trained highly-quantified pruned model.

21. The apparatus according to claim 20, wherein the using the pruned model to label the training data in the unlabeled training dataset to obtain a training dataset comprises:

inputting the training data into the pruned model, and using an output of a reference network layer in the pruned model as a label of the training data, wherein the reference network layer corresponds to the at least one selected neural network layer in the highly-quantified pruned model; and using the training data and the label of the training data as a group of training data in the training dataset.

22. The apparatus according to claim 20, wherein the training the highly-quantified pruned model based on the loss function and the training dataset to obtain the trained highly-quantified pruned model comprises:

obtaining a loss value by the loss function based on an output of the at least one neural network layer of the highly-quantified pruned model and a label of training data in the training dataset;

determining, based on the loss value, whether the loss function converges; and if the loss function converges, stop the training; or if the loss function does not converge, adjusting a parameter of the highly-quantified pruned model, and proceeding with a next training until the loss function converges or the number of training iterations reaches the preset threshold of the training iterations.

23. The apparatus according to claim 22, further comprising:

an inverse quantification module configured to: if the number of training iterations reaches the preset threshold of the training iterations and the loss function does not converge, increase a bit quantity of at least one weight parameter of the highly-quantified pruned model from the second bit quantity to the first bit quantity with reference to a weight parameter of the neural network layer in the pruned model.

24. The apparatus according to claim 19, wherein the quantifying a bit quantity of a weight parameter of each neural network layer in the pruned model from the first bit quantity to the second bit quantity comprises:

selecting at least one neural network layer from the pruned model by a preset algorithm successively, and quantifying a bit quantity of a weight parameter of the at least one neural network layer from the first bit quantity to the second bit quantity.

25. A chip, wherein the chip comprises the apparatus according to claim 13.

26. An electronic device, comprising: a memory and a processor, wherein the memory is configured to store at least one computer instruction, and the at least one computer instruction is executed by the processor to perform the steps of the method according to claim 1.

27. A non-transitory computer-readable storage medium storing a computer instruction, wherein the computer instruction is executed by a processor to perform the steps of the method according to claim 1.

* * * * *